United States Patent
Petri

(10) Patent No.: US 8,140,589 B2
(45) Date of Patent: Mar. 20, 2012

(54) AUTONOMIC UPDATING OF TEMPLATES IN A CONTENT MANAGEMENT SYSTEM

(75) Inventor: John Edward Petri, Lewiston, MN (US)

(73) Assignee: International Business Machines Corporation, Armonk, NY (US)

( * ) Notice: Subject to any disclaimer, the term of this patent is extended or adjusted under 35 U.S.C. 154(b) by 679 days.

(21) Appl. No.: 11/692,693

(22) Filed: Mar. 28, 2007

(65) Prior Publication Data
US 2008/0243897 A1 Oct. 2, 2008

(51) Int. Cl.
*G06F 17/30* (2006.01)
*G06F 17/00* (2006.01)

(52) U.S. Cl. .......... 707/804; 707/807; 715/235

(58) Field of Classification Search .......... 707/102, 707/100, 999.005, 999.102, 999.103, 804, 707/807, 674, 764, 999.002; 715/205–208, 715/501.1, 517, 530, 500, 513, 246, 235, 715/738
See application file for complete search history.

(56) References Cited

U.S. PATENT DOCUMENTS

| | | | |
|---|---|---|---|
| 5,802,493 A * | 9/1998 | Sheflott et al. ............. | 705/1.1 |
| 6,189,019 B1 | 2/2001 | Blumer et al. | |
| 6,356,903 B1 * | 3/2002 | Baxter et al. ............. | 707/10 |
| 7,039,594 B1 * | 5/2006 | Gersting ............. | 705/7 |
| 7,043,481 B2 * | 5/2006 | Mullins et al. ............. | 1/1 |
| 7,404,209 B2 | 7/2008 | Shipp | |
| 7,584,417 B2 | 9/2009 | Friend et al. | |
| 7,607,078 B2 * | 10/2009 | Geva et al. ............. | 715/221 |
| 7,627,568 B2 | 12/2009 | McKeeth | |
| 7,644,361 B2 | 1/2010 | Wu et al. | |
| 2001/0056460 A1 * | 12/2001 | Sahota et al. ............. | 709/201 |
| 2002/0059181 A1 | 5/2002 | Kohda et al. | |
| 2004/0181543 A1 | 9/2004 | Wu et al. | |
| 2004/0205571 A1 * | 10/2004 | Adler et al. ............. | 715/513 |
| 2005/0015379 A1 * | 1/2005 | Aureglia et al. ............. | 707/100 |
| 2005/0015394 A1 | 1/2005 | McKeeth | |
| 2005/0071748 A1 | 3/2005 | Shipp | |
| 2005/0091581 A1 | 4/2005 | Bezrukov et al. | |
| 2005/0114757 A1 * | 5/2005 | Sahota et al. ............. | 715/501.1 |
| 2006/0004868 A1 | 1/2006 | Claudatos et al. | |
| 2006/0031762 A1 * | 2/2006 | Takashima ............. | 715/517 |
| 2006/0206866 A1 | 9/2006 | Eldrige et al. | |
| 2007/0009158 A1 * | 1/2007 | Geva et al. ............. | 382/209 |

(Continued)

OTHER PUBLICATIONS

Eric Severson, "Integratin XML Publishing with a Content Management System: Best Practices", pp. 1-21, printed at http://flatironsolutions.com/downloads/integrating_xml_publishing_with_cms.pdf on Feb. 26, 2008.

(Continued)

*Primary Examiner* — Mohammad Ali
*Assistant Examiner* — Bao Tran
(74) *Attorney, Agent, or Firm* — Martin & Associates LLC; Derek P. Martin

(57) ABSTRACT

A content management system (CMS) autonomically updates one or more templates based on characteristics of documents in the repository, and based on specified criteria in an autonomic template update policy. At an appointed time, the CMS finds a template in the repository, retrieves an autonomic template update policy corresponding to the template, and determines from characteristics of documents in the repository whether the criteria in the autonomic template update policy allows autonomically updating the template. If the criteria are met, the template is autonomically updated without intervention by a CMS administrator. The result is a CMS where templates autonomically change as the content in the repository changes.

10 Claims, 7 Drawing Sheets

U.S. PATENT DOCUMENTS

| | | | |
|---|---|---|---|
| 2007/0088757 A1* | 4/2007 | Mullins et al. | 707/200 |
| 2007/0112777 A1 | 5/2007 | Field et al. | |
| 2007/0143674 A1* | 6/2007 | Daos et al. | 715/530 |
| 2007/0206221 A1* | 9/2007 | Wyler et al. | 358/1.15 |
| 2008/0021861 A1* | 1/2008 | Fitzsimons et al. | 707/1 |
| 2008/0243807 A1* | 10/2008 | Gaucas et al. | 707/5 |
| 2008/0243915 A1* | 10/2008 | Shah et al. | 707/103 Y |
| 2009/0157382 A1* | 6/2009 | Bar | 704/8 |
| 2009/0307583 A1* | 12/2009 | Tonisson | 715/246 |

OTHER PUBLICATIONS

Johnson, R.B. "Image Processing for Compound Documents", Institute of Electrical and Electronic Engineers (IEEE), pp. 1-8, 1995.

Al-Hawamdeh, Suliman et al. "Compound Document Processing System", Institute of Electrical and Electronic Engineers (IEEE), pp. 640-644, 1991.

Satoh, Ichiro "A Compound Document Framework for Multimedia Networking", Proceedings of the First International Conference on Distributed Frameworks fro Multimedia Applications (DFMA'05) 0-7695-2273-4/05.

Heck, Eliminate Web Publishing Bottlenecks, Aug. 4, 2000, Infoworld.

Holly, PIM: European Drug Labeling Goes XML, Dec. 14, 2001, IDEAlliance.

* cited by examiner

| CMS attribute name | CMS attribute value |
|---|---|
| obj_id | template1 |
| obj_type | template |
| region | EMEA |

← 510

```
<root>
    <title>
        Put the label name here.
        <description>
            Put a brief description of the label here.
        </description>
    </title>
    <intro>
        <header>
            Put the label heading here.
        </header>
    </intro>
    <content>
        Place content here.
    </content>
</root>
```
} 520

| CMS attribute name | CMS attribute value |
|---|---|
| obj_id | document_1 |
| obj_type | document |
| subtype | Final Labeling |
| region | Americas |

← 610

```
<root>
    <title>
        Sneeze-free.
        <xi:include href="score:obj_id:document_5"/>
    </title>
    <intro>
        <xi:include href="score:obj_id:document_6"/>
    </intro>
    <content>
        This drug contains the following ingredients: abc, def, ghi.
        Please adhere to the following usage chart:
        <image href="sneeze-free-usage.jpg"/>
    </content>
</root>
```

| CMS attribute name | CMS attribute value |
|---|---|
| obj_id | document_2 |
| obj_type | document |
| subtype | Final Labeling |
| region | EMEA |

710

```
<root>
    <title>
        Drip-free.
        <xi:include href="score:obj_id:document_5"/>
    </title>
    <intro>
        <xi:include href="score:obj_id:document_6"/>
    </intro>
    <content>
        This drug contains the following ingredients: jkl, mno, pqr.
        Please adhere to the following usage chart:
        <image href="drip-free-usage.jpg"/>
    </content>
</root>
```

| CMS attribute name | CMS attribute value |
|---|---|
| obj_id | document_3 |
| obj_type | document |
| subtype | Final Labeling |
| region | EMEA |

810

```
<root>
    <title>
        Itch-free.
        <description>
            This label describes the ingredients and
            recommended dosage for the Itch-free drug.
        </description>
    </title>
    <intro>
        <xi:include href="score:obj_id:document_6"/>
    </intro>
    <content>
        This drug contains the following ingredients: stu, vwx, yz.
        Please adhere to the following usage chart:
        <image href="itch-free-usage.jpg"/>
    </content>
</root>
```

| CMS attribute name | CMS attribute value |
|---|---|
| obj_id | document_4 |
| obj_type | document |
| subtype | Final Labeling |
| region | Americas |

910

```
<root>
    <title>
        Feel-better.
        <description>
            This label describes the ingredients and
        recommended dosage for the Feel-better drug.
        </description>
    </title>
    <intro>
        <xi:include href="score:obj_id:document_6"/>
    </intro>
    <content>
        This drug contains the following ingredients: ingredient1,
ingredient2, ingredient3.
        Please adhere to the following usage chart:
        <image href="feel-better-usage.jpg"/>
    </content>
</root>
```

| CMS attribute name | CMS attribute value |
|---|---|
| obj_id | document_5 |
| obj_type | fragment |

1010

```
<description>
    This label describes the ingredients and recommended dosage for an
antihistamine drug.
</description>
```

| CMS attribute name | CMS attribute value |
|---|---|
| obj_id | document_6 |
| obj_type | fragment |

1110

```
<header>
    Ingredients and Recommended Dosage
</header>
```

FIG. 11

AUTONOMIC UPDATING OF TEMPLATES IN A CONTENT MANAGEMENT SYSTEM

BACKGROUND

1. Technical Field

This disclosure generally relates to content management systems, and more specifically relates to a content management system that autonomically updates templates for generating documents.

2. Background Art

A content management system (CMS) allows many users to efficiently share electronic content such as text, audio files, video files, pictures, graphics, etc. Content management systems typically control access to content in a repository. A user may generate content, and when the content is checked into the repository, the content is checked by the CMS to make sure the content conforms to predefined rules. A user may also check out content from the repository, or link to content in the repository while generating content. The rules in a CMS assure that content to be checked in or linked to meets desired criteria specified in the rules.

Known content management systems check their rules when content is being checked in. If the rule is satisfied, the content is checked into the repository. If the rule is not satisfied, the content is not checked into the repository. Known content management systems may include rules related to bursting, linking, and synchronization. Bursting rules govern how a document is bursted, or broken into individual chunks, when the document is checked into the repository. By bursting a document into chunks, the individual chunks may potentially be reused later by a different author. Linking rules govern what content in a repository a user may link to in a document that will be subsequently checked into the repository. Synchronization rules govern synchronization between content and metadata related to the content. For example, a synchronization rule may specify that whenever a specified CMS attribute is changed, a particular piece of XML in the content should be automatically updated with that attribute's value.

Templates are often used in known content management systems to speed up and simplify the process of generating a document. A template is a document that includes predefined structure and content that gives the author a shortcut in generating a document of a particular type. In known content management systems, templates are manually generated by a CMS administrator, and must be manually maintained by a CMS administrator. Without a way to automate some of the manual tasks normally performed by a CMS administrator in updating templates, the computer industry will continue to suffer from manual and inefficient tasks that must be performed when a template in a CMS needs to be updated.

BRIEF SUMMARY

A content management system (CMS) autonomically updates one or more templates based on characteristics of documents in the repository, and based on user-specified criteria in an autonomic template update policy. At an appointed time, the CMS finds a template in the repository, retrieves an autonomic template update policy corresponding to the template, and determines from characteristics of documents in the repository whether the criteria in the autonomic template update policy allows autonomically updating the template. If the criteria are met, the template is autonomically updated without intervention by a CMS administrator. The result is a CMS where templates are autonomically changed as the content in the repository changes.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 5 is a sample document in a repository in a CMS that is a template;

FIG. 6 is a first sample document in the repository;

FIG. 7 is a second sample document in the repository;

FIG. 8 is a third sample document in the repository;

FIG. 9 is a fourth sample document in the repository;

FIG. 10 is a fifth sample document in the repository that is a fragment;

FIG. 11 is a sixth sample document in the repository that is a fragment;

DETAILED DESCRIPTION

The claims and disclosure herein provide a content management system (CMS) that autonomically updates one or more templates according to characteristics of documents in the repository and according to one or more criteria specified in an autonomic template update policy. A template is selected, a corresponding policy is read, and if the characteristics of corresponding documents in the repository satisfy the policy, the template is autonomically updated.

Many known content management systems use extensible markup language (XML) due to its flexibility and power in managing diverse and different types of content. One known content management system that uses XML is Solution for Compliance in a Regulated Environment (SCORE) developed by IBM Corporation. XML is growing in popularity, and is quickly becoming the preferred format for authoring and publishing. While the disclosure herein discusses XML documents as one possible example of content that may be managed by a content management system, the disclosure and claims herein expressly extend to content management systems that do not use XML.

Figure 1:
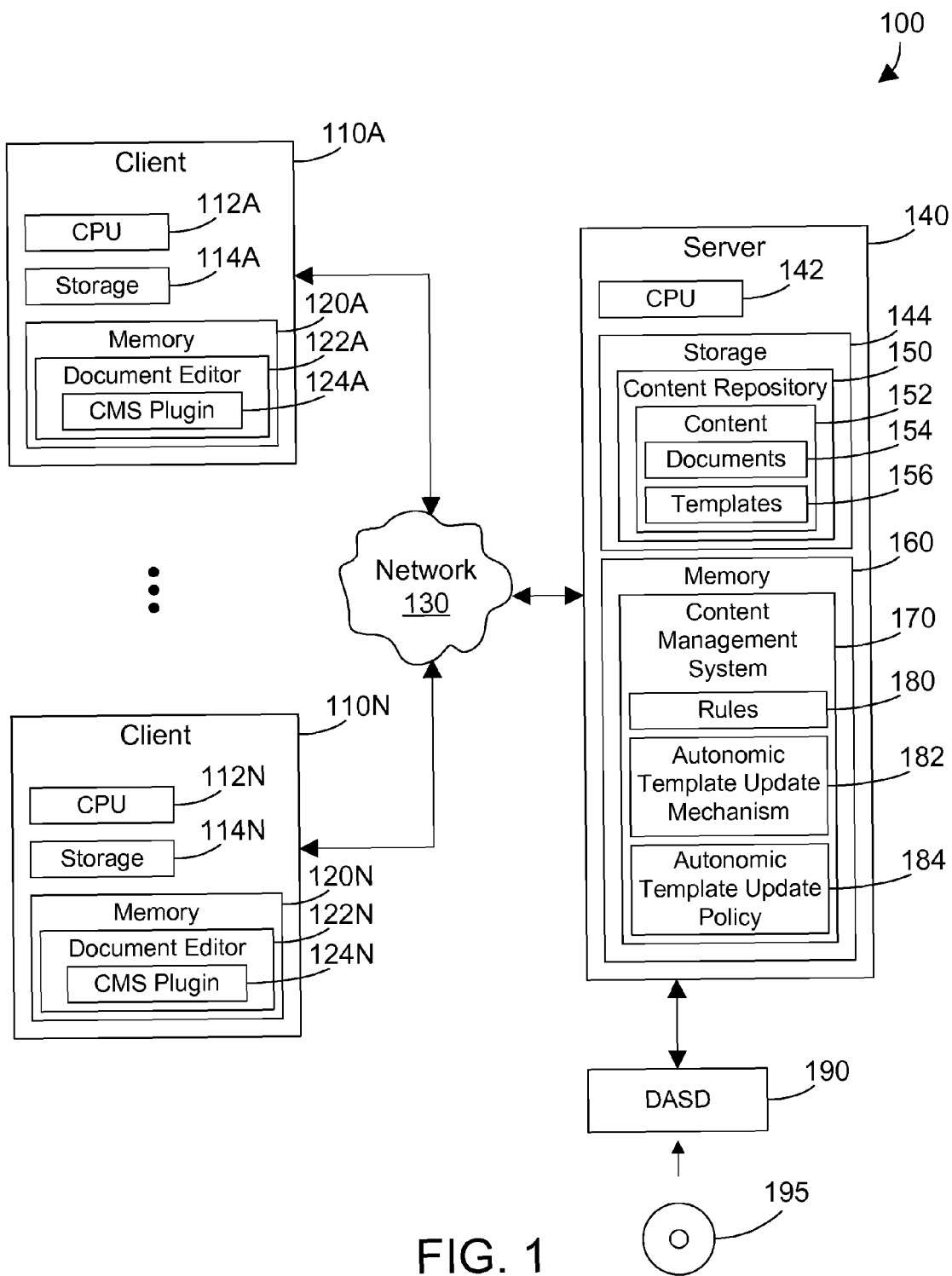
FIG. 1 is a block diagram of a networked computer system that includes a server computer system that has a content management system that includes an autonomic template update mechanism.

Referring to FIG. 1, networked computer system 100 includes multiple clients, shown in FIG. 1 as clients 110A, . . . , 110N, coupled to a network 130. Each client preferably includes a CPU, storage, and memory that contains a document editor and a content management system (CMS) plugin. Thus, client 110A includes a CPU 112A, storage 114A, memory 120A, a document editor 122A in the memory 120A that is executed by the CPU 112A, and a CMS plugin 124A that allows the document editor 122A to interact with content 152 in the repository 150 that is managed by the CMS 170 in server 140. In similar fashion, other clients have similar components shown in client 110A, through client 110N, which includes a CPU 112N, storage 114N, memory 120N, a document editor 122N, and a CMS plugin 124N.

The CMS 170 resides in the main memory 160 of a server computer system 140 that also includes a CPU 142 and storage 144 that includes a content repository 150 that holds content 152 managed by the CMS 170. Content 152 preferably includes documents 154 and templates 156. Templates 156 are a specific type of document that includes default structure and content an author may use as a starting point when creating a document of a particular type. The concept of a template in the word processing field is well-known in the art. One example of a suitable server computer system 140 is an IBM eServer System i computer system. However, those skilled in the art will appreciate that the disclosure herein applies equally to any type of client or server computer systems, regardless of whether each computer system is a complicated multi-user computing apparatus, a single user workstation, or an embedded control system. CMS 170 includes rules 180, an autonomic template update mechanism 182, and an autonomic template update policy 184. Rules 180 may include bursting rules, linking rules, and synchronization rules. Of course, other rules, whether currently known or developed in the future, could also be included in rules 180. Autonomic template update mechanism 182 analyzes an existing template 156 and its corresponding policy 184, and determines from the autonomic template update policy 184 when to autonomically update the template 156. The autonomic template update policy 184 specifies one or more criteria that governs the autonomic updating of templates in a content management system.

In FIG. 1, repository 150 is shown separate from content management system 170. In the alternative, repository 150 could be within the content management system 170. Regardless of the location of the repository 150, the content management system 170 controls access to content 152 in the repository 150.

Server computer system 140 may include other features of computer systems that are not shown in FIG. 1 but are well-known in the art. For example, server computer system 140 preferably includes a display interface, a network interface, and a mass storage interface to an external direct access storage device (DASD) 190. The display interface is used to directly connect one or more displays to server computer system 140. These displays, which may be non-intelligent (i.e., dumb) terminals or fully programmable workstations, are used to provide system administrators and users the ability to communicate with server computer system 140. Note, however, that while a display interface is provided to support communication with one or more displays, server computer system 140 does not necessarily require a display, because all needed interaction with users and other processes may occur via the network interface.

The network interface is used to connect the server computer system 140 to multiple other computer systems (e.g., 110A, . . . , 110N) via a network, such as network 130. The network interface and network 130 broadly represent any suitable way to interconnect electronic devices, regardless of whether the network 130 comprises present-day analog and/or digital techniques or via some networking mechanism of the future. In addition, many different network protocols can be used to implement a network. These protocols are specialized computer programs that allow computers to communicate across a network. TCP/IP (Transmission Control Protocol/Internet Protocol) is an example of a suitable network protocol.

The mass storage interface is used to connect mass storage devices, such as a direct access storage device 190, to server computer system 140. One specific type of direct access storage device 190 is a readable and writable CD-RW drive, which may store data to and read data from a CD-RW 195.

Main memory 160 preferably contains data and an operating system that are not shown in FIG. 1. A suitable operating system is a multitasking operating system known in the industry as i5/OS; however, those skilled in the art will appreciate that the spirit and scope of this disclosure is not limited to any one operating system. In addition, server computer system 140 utilizes well known virtual addressing mechanisms that allow the programs of server computer system 140 to behave as if they only have access to a large, single storage entity instead of access to multiple, smaller storage entities such as main memory 160, storage 144 and DASD device 190. Therefore, while data, the operating system, and content management system 170 may reside in main memory 160, those skilled in the art will recognize that these items are not necessarily all completely contained in main memory 160 at the same time. It should also be noted that the term "memory" is used herein generically to refer to the entire virtual memory of server computer system 140, and may include the virtual memory of other computer systems coupled to computer system 140.

CPU 142 may be constructed from one or more microprocessors and/or integrated circuits. CPU 142 executes program instructions stored in main memory 160. Main memory 160 stores programs and data that CPU 142 may access. When computer system 140 starts up, CPU 142 initially executes the program instructions that make up the operating system.

Although server computer system 140 is shown to contain only a single CPU, those skilled in the art will appreciate that a content management system 170 may be practiced using a computer system that has multiple CPUs. In addition, the interfaces that are included in server computer system 140 (e.g., display interface, network interface, and DASD interface) preferably each include separate, fully programmed microprocessors that are used to off-load compute-intensive processing from CPU 142. However, those skilled in the art will appreciate that these functions may be performed using I/O adapters as well.

At this point, it is important to note that while the description above is in the context of a fully functional computer system, those skilled in the art will appreciate that the content management system 170 may be distributed as an article of manufacture in a variety of forms, and the claims extend to all suitable types of computer-readable media used to actually carry out the distribution, including recordable media such as floppy disks and CD-RW (e.g., 195 of FIG. 1).

Embodiments herein may also be delivered as part of a service engagement with a client corporation, nonprofit organization, government entity, internal organizational structure, or the like. These embodiments may include configuring a computer system to perform some or all of the methods described herein, and deploying software, hardware, and web services that implement some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

Figure 2:
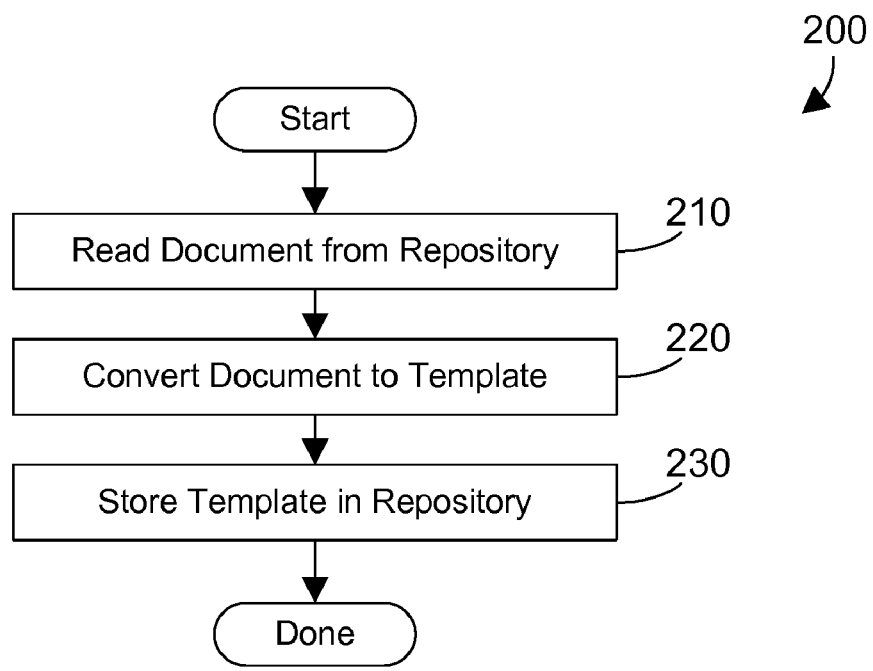
FIG. 2 is a flow diagram of a prior art method for creating a template that may be used to create a document.

Referring to FIG. 2, a prior art method 200 for manually creating a template from a document in the repository begins by reading a document from the repository (step 210). The document is then converted to a template (step 220). The difference between a document and a template may be very small, or may be significant. For example, a document may simply be designated a template, which allows the document to be reused as a starting point when an author desires to create a document of a particular type. In the alternative, a template may provide special tools not normally provided in documents that include pick lists and other tools that aid the author in drafting a document using the template. As used herein, the term "template" means a document that includes predefined structure and content that an author may use when generating a document of a particular type. Once the document is converted to a template in step 220, the template is stored in the repository (step 230). Prior art method 200 in FIG. 2 is performed manually by a CMS administrator or authorized user. In addition to manually creating a template from an existing document as shown by method 200 in FIG. 2, a CMS administrator or authorized user of the CMS may directly generate a template from scratch, then store the template in the repository.

Figure 3:
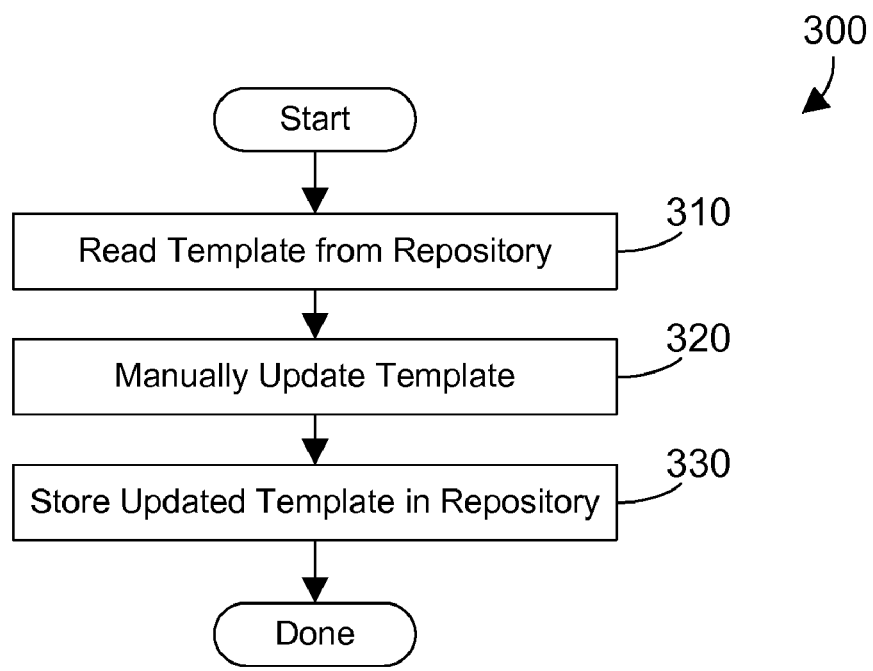
FIG. 3 is a flow diagram of a prior art method for a CMS administrator to manually update a template.

FIG. 3 shows a prior art method 300 for updating a template. A template is read from the repository (step 310). The template is then manually updated (step 320). The updated template is then stored in the repository (step 330). Prior art method 300 in FIG. 3 is performed manually by a CMS administrator or authorized user. Nowhere does the prior art teach or suggest autonomically updating templates in a CMS.

The disclosure and claims herein recognize that autonomic updating of templates according to characteristics of documents in the repository allows templates to dynamically change according to the content in documents in the repository. By allowing autonomically updating templates, a CMS administrator is relieved of the burden of manually updating templates.

Figure 4:
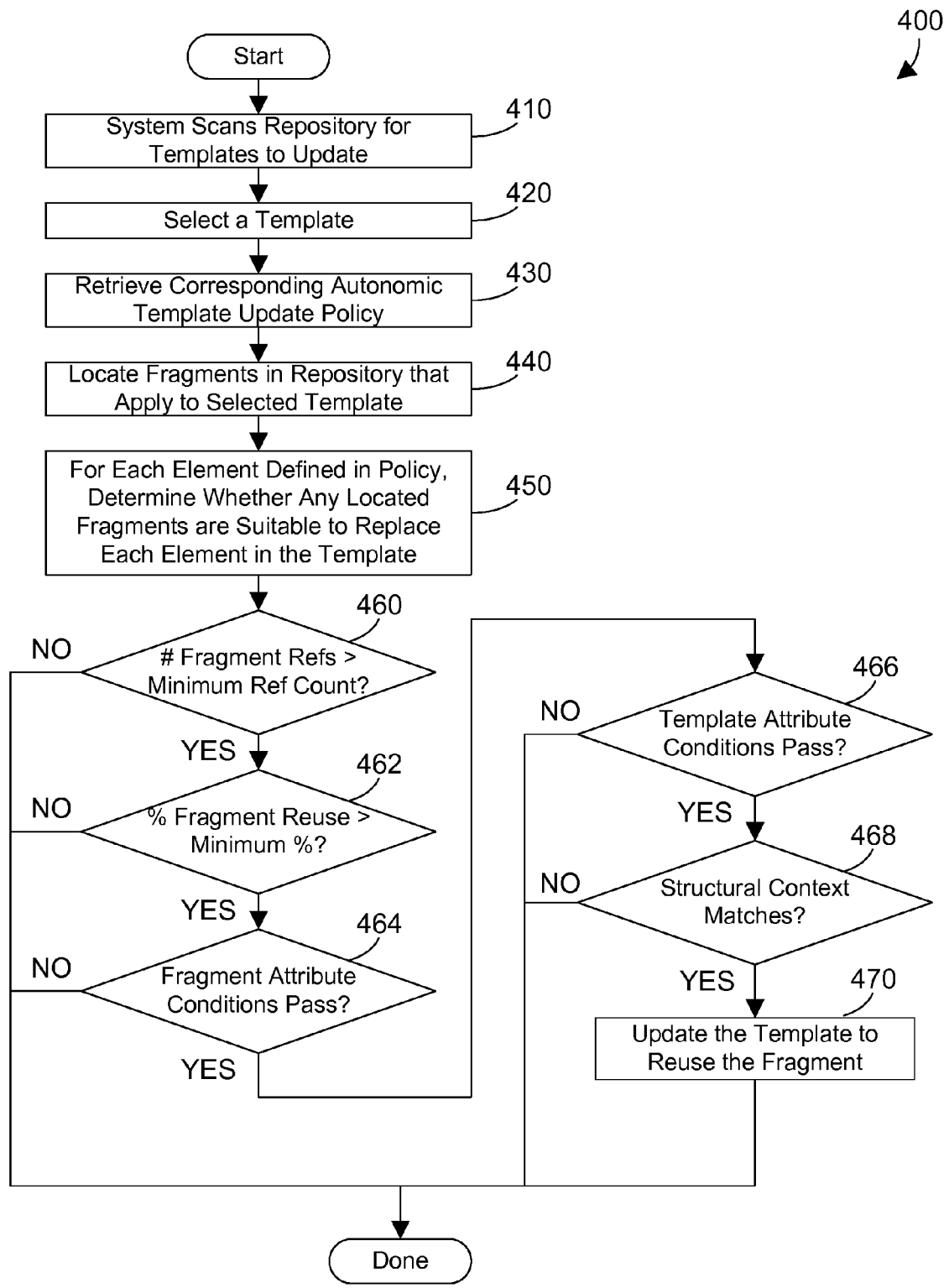
FIG. 4 is a flow diagram of a method for processing a template in a content management system and for autonomically updating the template if criteria in the autonomic template update policy are satisfied.

Referring to FIG. 4, a method for autonomically updating templates in a CMS begins by scanning the repository for templates to update (step 410). One of the templates is selected (step 420). An associated autonomic template update policy is then retrieved (step 430). A policy may be defined for each template. However, in the most preferred implementation, a policy is defined for a particular document type, thereby allowing multiple templates of the same type to share a policy. A policy may be bound to its corresponding templates using CMS relationships. Fragments in the repository that apply to the selected template are then located (step 440). For example, a CMS query can be run in step 440 to return all fragments in the repository that are referenced by the parent documents that are of the same document type as the template. For each element defined in the policy, determine whether any located fragments are suitable to replace each element in the template (step 450). Only the fragments that match (e.g., have the same element name) are considered to replace an element in the template. Next, method 400 makes several checks of the fragments and other documents in the repository against criteria specified in the autonomic template update policy. If the number of fragment references in the corresponding documents in the repository is greater than a specified minimum reference count in the policy (step 460=YES), method 400 goes to step 462. If the percent of fragment reuse in the corresponding documents in the repository is greater than a specified minimum percentage in the policy (step 462=YES), method 400 goes to step 464. If the fragment attribute conditions in the policy are satisfied by the corresponding documents in the repository (step 464=YES), method 400 goes to step 466. If the template attribute conditions in the policy are satisfied by the corresponding template in the repository (step 466=YES), method 400 goes to step 468. If the structural context specified in the policy matches the structural context of the fragments in the corresponding documents in the repository (step 468=YES), method 400 goes to step 470. If all of the tests in steps 460, 462, 464, 466, and 468 pass, the template is updated to reuse the fragment (step 470). If any of the tests in steps 460, 462, 464, 466 and 468 fail, method 400 is done without updating the template. Note that method 400 can be performed when requested by a CMS administrator, when requested by an author, or at specified periodic intervals. In the most preferred implementation, method 400 is performed at specified periodic intervals (such as once per week) to allow autonomically updating templates without a CMS administrator or author having to explicitly request the update. Method 400 in FIG. 4 is preferably performed by the autonomic template update mechanism 182 in FIG. 1.

A very simple example is now presented in FIGS. 5-13 to illustrate the function of method 400 in FIG. 4. This example assumes an XML-based CMS. A document 500 in a repository in a content management system (such as CMS 170 in FIG. 1) is shown in FIG. 5. This document includes a header 510 that has metadata that describes the document. Header 510 specifies an obj_id of templates, which is used to uniquely identify document 500 within the CMS. The obj_type is "template", which means this document is a template in the repository. The region attribute have a value of "EMEA." Template 500 in FIG. 5 is one suitable example of template 156 in FIG. 1. Note the body of template 500 includes defined structure and content that provides a starting point for an author to draft a new document of a particular type. This sample template 500 is a template for creating a new drug label.

We assume the CMS repository (150 in FIG. 1) includes other documents (154 in FIG. 1), and these documents include document 600 in FIG. 6, document 700 in FIG. 7, document 800 in FIG. 8, document 900 in FIG. 9, document 1000 in FIG. 10, and document 1100 in FIG. 11. Each of these documents has corresponding metadata 610 in FIG. 6, 710 in FIG. 7, 810 in FIG. 8, 910 in FIG. 9, 1010 in FIG. 10, and 1110 in FIG. 11. Document 600 in FIG. 6 has an obj_type of "document", a subtype of "Final Labeling", and a region of "Americas". Document 600 is a final label for a drug called Sneeze-free. Document 700 in FIG. 7 has an obj_type of "document", a subtype of "Final Labeling", and a region of "EMEA". Document 700 is a final label for a drug called Drip-free. Document 800 in FIG. 8 has an obj_type of "document", a subtype of "Final Labeling", and a region of "EMEA". Document 800 is a final label for a drug called Itch-free. Document 900 in FIG. 9 has an obj_type of "document", a subtype of "Final Labeling", and a region of "Americas". Document 900 is a final label for a drug called Feelbetter. Document 1000 in FIG. 10 has an obj_type of "fragment", and is a fragment that has been stored separately in the repository. Such fragments may be stored as separate objects in the repository when the fragment is bursted. Document 1000 is a fragment for an element called "description". Document 1100 in FIG. 11 has an obj_type of "fragment", and is a fragment for an element called "header".

Figure 12:
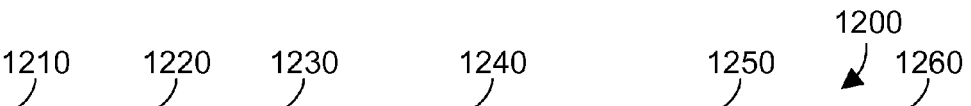
FIG. 12 is a sample autonomic template update policy.
Figure 13:
FIG. 13 is the sample template in FIG. 5 after applying method 400 in FIG. 4 with the documents in FIGS. 6-11 and the policy in FIG. 12.

FIG. 12 shows a sample autonomic template update policy 1200 for this specific example. Policy 1200 is one specific example of autonomic template update policy 184 in FIG. 1.

Policy 1200 includes a column 1210 that specifies a template element XPath; a column 1220 that specifies a minimum reference count; a column 1230 that specifies a minimum reuse percentage; a column 1240 that specifies fragment attribute conditions; a column 1250 that specifies template attribute conditions; and a column 1260 that specifies structural context. There are two entries in policy 1240, one for the /root/title/description element, and one for the /root/intro/ header element.

Now we consider method 400 in light of the template 500 in FIG. 5, the documents 600, 700, 800, 900, 1000 and 1100 in FIGS. 6-11, respectively, and the autonomic template update policy 1200 in FIG. 12. Referring to FIG. 4, the system scans the repository for templates to update (step 410). We assume the template 500 in FIG. 5 is selected (step 420). The corresponding policy 1200 in FIG. 12 is then retrieved (step 430). The fragments in the repository that apply to the selected template are located (step 440). A fragment corresponding to the "description" element specified in the first row of policy 1200 is found in document 1000 in FIG. 10. A fragment corresponding to the "header" element specified in the second row of policy 1200 is found in document 1100 in FIG. 11. Now for each element defined in the policy, method 400 determines whether these fragments 1000 in FIG. 10 and 1100 in FIG. 11 are suitable to replace each element in the template (step 450). In this specific example, the fragments 1000 and 1100 have the same names as specified in the XPath in policy 1200, so both of these fragments are suitable to replace the corresponding elements in the template 500 (step 450=YES).

Now method 400 checks to see if the criteria specified in the policy 1200 are satisfied so the template may be autonomically updated. First we consider the "description" fragment 1000 in FIG. 10. The minimum fragment references in column 1220 in FIG. 12 is zero for the /root/title/description row, and the number of references for the "description" fragment 1000 in the repository is two, one in document 800 in FIG. 8 and one in document 900 in FIG. 9. As a result, step 460=YES. The minimum reuse percentage for this element is 75%, as specified in column 1230 in FIG. 12. Of the four documents 600, 700, 800 and 900 in the repository, only two have the description element. As a result, the minimum reuse percentage in column 1230 in FIG. 12 is not satisfied (step 462=NO), so method 400 does not update the template with respect to the "description" element.

Now we consider the second row in the policy 1200 in FIG. 12 that applies to the "header" element. Column 1220 in the second row of table 1200 specifies a minimum reference count of two. All four documents 600, 700, 800 and 900 in FIGS. 6-9 reference the header fragment 1100 in FIG. 11 via an xi:include element that specifies document_6. As a result, the minimum reference count is satisfied (step 460=YES). The specified minimum reuse percentage in column 1230 in FIG. 12 is zero. Since four of four documents include a reference to the header fragment, the minimum reuse percentage in column 1230 in FIG. 12 is satisfied (step 462=YES). Next method 400 determines if the fragment attribute conditions in column 1240 in FIG. 12 pass (step 464). The fragment attribute conditions for the /root/intro/header element specify that the parent document must have a subtype of "Final Labeling". All four documents 600, 700, 800 and 900 in FIGS. 6-9 have a subtype of "Final Labeling" (step 464=YES). Method 400 then determines if the template attribute conditions in column 1250 in FIG. 12 pass (step 466). The template attribute conditions for the /root/intro/header element specify the region have a value of EMEA. Since the region attribute of the template 500 has a value of EMEA, this template attribute condition also passes (step 466=YES). The structural context of the header fragment is then checked (step 468). Because the header fragment is referenced in xi:include elements that are inside the "intro" element, which is inside the "root" element in each of these documents, the structural context for the fragment matches the specified /root/intro/header XPath (step 468=YES). As a result, the template 500 is autonomically updated to replace the header element 520 in FIG. 5 with an Xinclude statement, as shown at 1310 in FIG. 13.

The disclosure and claims herein provide a way to autonomically update templates according to characteristics of documents in the repository and according to specified criteria in an autonomic template update policy. Autonomically updating templates relieves a CMS administrator of the burden of manually updating templates, and allows the CMS to autonomically adapt as the content in the repository changes.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims. For example, while the examples in the figures and discussed above related to XML documents, the disclosure and claims herein expressly extend to content management systems that handle any suitable type of content, whether currently known or developed in the future.

What is claimed is:

1. An apparatus comprising:
   at least one processor;
   a memory coupled to the at least one processor;
   a repository residing in the memory, the repository including a plurality of documents and a plurality of templates;
   a content management system residing in the memory and executed by the at least one processor, the content management system comprising:
   an autonomic template update mechanism that selects without input from a user one of the plurality of templates in the repository, reads without input from the user a corresponding autonomic template update policy that specifies at least one user-specified condition for comparing an element in the selected template with at least one of the plurality of documents in the repository, analyzes without input from the user corresponding documents in the repository, wherein the at least one user-specified condition comprises a minimum count of the element in the analyzed corresponding documents and a minimum reuse percentage of the element in the analyzed corresponding documents, and when the corresponding documents in the repository satisfy the autonomic template update policy, autonomically updating the selected template without input from the user according to at least one characteristic of the analyzed documents in the repository, wherein the corresponding autonomic template update policy specifies the element and the at least one user-specified condition that, when satisfied by the at least one characteristic of the analyzed documents in the repository, cause the element in the selected template to be replaced with a statement in the updated selected template that references one of the plurality of documents in the repository.

2. The apparatus of claim 1 wherein the at least one user-specified condition comprises fragment attribute conditions.

3. The apparatus of claim 1 wherein the at least one user-specified condition comprises template attribute conditions.

4. A computer-implemented method for autonomically updating a template in a content management system, the method comprising the steps of:
  providing at least one processor;
  providing a memory coupled to the at least one processor;
  the template residing in a repository in the memory;
  reading without input from a user the template from the repository;
  reading without input from the user an autonomic template update policy corresponding to the template that specifies at least one user-specified condition for comparing an element in the template with at least one of the plurality of documents in the repository;
  analyzing without input from the user corresponding documents in the repository;
  wherein the at least one user-specified condition comprises a minimum count of the element in the analyzed corresponding documents and a minimum reuse percentage of the element in the analyzed corresponding documents;
  when the corresponding documents in the repository satisfy the autonomic template update policy, autonomically updating the template without input from the user according to at least one characteristic of the analyzed documents in the repository; and
  wherein the corresponding autonomic template update policy specifies the element and the at least one user-specified condition that, when satisfied by the at least one characteristic of the analyzed documents in the repository, cause the element in the selected template to be replaced with a statement in the updated selected template that references one of the plurality of documents in the repository.

5. The method of claim 4 wherein the at least one user-specified condition comprises fragment attribute conditions.

6. The method of claim 4 wherein the at least one user-specified condition comprises template attribute conditions.

7. A computer-implemented method for autonomically updating a template in a content management system, the method comprising the steps of:
  providing at least one processor;
  providing a memory coupled to the at least one processor;
  the template residing in a repository in the memory;
  selecting without input from a user the template from a plurality of templates in the repository;
  reading without input from the user an autonomic template update policy corresponding to the selected template;
  analyzing without input from the user corresponding documents in the repository that apply to the selected template and contain at least one fragment;
  for each element defined in the autonomic template update policy, determining without input from the user whether any fragments in the corresponding documents are suitable to replace each element in the selected template;
  when a number of fragment references in the corresponding documents is greater than a specified minimum count of fragment references in the autonomic template update policy, and when a percentage of fragment reuse in the corresponding documents is greater than a specified minimum reuse percentage in the autonomic template update policy, and when fragment attribute conditions specified in the autonomic template update policy are satisfied by the corresponding documents, and when template attribute conditions specified in the autonomic template update policy are satisfied by the corresponding documents, and when the structural context of the corresponding documents matches a specified structural content in the autonomic template update policy, autonomically updating the selected template without input from the user to include at least one link to at least one fragment in the corresponding documents.

8. An article of manufacture comprising:
(A) a content management system comprising:
  an autonomic template update mechanism that selects without input from a user one of a plurality of templates in a repository, reads without input from the user a corresponding autonomic template update policy that specifies at least one user-specified condition for comparing an element in the selected template with at least one of the plurality of documents in the repository, analyzes without input from the user corresponding documents in the repository, wherein the at least one user-specified condition comprises a minimum count of the element in the analyzed corresponding documents and a minimum reuse percentage of the element in the analyzed corresponding documents, and when the corresponding documents in the repository satisfy the autonomic template update policy, autonomically updating the selected template without input from the user according to at least one characteristic of the analyzed documents in the repository, wherein the corresponding autonomic template update policy specifies the element and the at least one user-specified condition that, when satisfied by the at least one characteristic of the analyzed documents in the repository, cause the element in the selected template to be replaced with a statement in the updated selected template that references one of the plurality of documents in the repository; and
(B) recordable media bearing the content management system.

9. The article of manufacture of claim 8 wherein the at least one user-specified condition comprises fragment attribute conditions.

10. The article of manufacture of claim 8 wherein the at least one user-specified condition comprises template attribute conditions.

* * * * *